United States Patent
Plastina et al.

(10) Patent No.: US 7,580,932 B2
(45) Date of Patent: Aug. 25, 2009

(54) USER INTERFACE FOR ESTABLISHING A FILTERING ENGINE

(75) Inventors: Daniel Plastina, Sammamish, WA (US); Jonathan M. Cain, Seattle, WA (US); Michael J. Novak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 252 days.

(21) Appl. No.: 11/182,911

(22) Filed: Jul. 15, 2005

(65) Prior Publication Data

US 2007/0016599 A1    Jan. 18, 2007

(51) Int. Cl.
G06F 17/30    (2006.01)
(52) U.S. Cl. ............... 707/7; 707/4; 707/100; 707/101; 707/104.1
(58) Field of Classification Search .......... None
See application file for complete search history.

(56) References Cited

U.S. PATENT DOCUMENTS

| | | | |
|---|---|---|---|
| 5,616,876 A | 4/1997 | Cluts | |
| 5,749,081 A | 5/1998 | Whiteis | |
| 6,041,311 A | 3/2000 | Chislenko et al. | |
| 6,118,450 A | 9/2000 | Proehl et al. | |
| 6,243,725 B1 | 6/2001 | Hempleman et al. | |
| 6,269,368 B1 * | 7/2001 | Diamond | 707/6 |
| 6,311,194 B1 | 10/2001 | Sheth et al. | |
| 6,356,971 B1 | 3/2002 | Katz et al. | |
| 6,438,579 B1 | 8/2002 | Hosken | |
| 6,452,609 B1 | 9/2002 | Katinsky et al. | |
| 6,453,336 B1 | 9/2002 | Beyda et al. | |
| 6,453,339 B1 | 9/2002 | Schultz et al. | |
| 6,526,411 B1 | 2/2003 | Ward | |
| 6,539,395 B1 | 3/2003 | Gjerdingen et al. | |
| 6,545,209 B1 | 4/2003 | Flannery et al. | |
| 6,605,770 B2 | 8/2003 | Yamane et al. | |
| 6,657,117 B2 | 12/2003 | Weare et al. | |
| 6,721,741 B1 | 4/2004 | Eyal et al. | |
| 6,748,395 B1 | 6/2004 | Picker et al. | |
| 6,760,721 B1 | 7/2004 | Chasen et al. | |
| 6,771,568 B2 | 8/2004 | Hochendoner | |
| 6,772,408 B1 | 8/2004 | Velonis et al. | |

(Continued)

FOREIGN PATENT DOCUMENTS

EP    1189437 A1    3/2002

(Continued)

OTHER PUBLICATIONS

MusicMatch, MusicMatch Jukebox User's Guide, Feb. 7, 2003, Chapters A1-A6 & 1-9.

(Continued)

*Primary Examiner*—Khanh B Pham
*Assistant Examiner*—Andalib F Lodhi
(74) *Attorney, Agent, or Firm*—Senniger Powers LLP

(57) ABSTRACT

A method for establishing a filtering engine for generating an ordered list of one or more media items selected from a library of media items. A user can select multiple filters and assign a weight to the filters according to the importance of each filter. In response, the playlist engine will generate a playlist of media items according to the weighted filters. A user interface includes elements for selecting and weighting filters for generating such a playlist.

20 Claims, 8 Drawing Sheets

U.S. PATENT DOCUMENTS

| | | |
|---|---|---|
| 6,941,324 B2 | 9/2005 | Plastina et al. |
| 6,947,922 B1 * | 9/2005 | Glance .......................... 707/3 |
| 6,996,390 B2 | 2/2006 | Herley et al. |
| 7,043,525 B2 | 5/2006 | Tuttle et al. |
| 7,149,983 B1 | 12/2006 | Robertson |
| 7,246,112 B2 | 7/2007 | Ishida et al. |
| 7,302,429 B1 * | 11/2007 | Wanker ......................... 707/7 |
| 2001/0031066 A1 | 10/2001 | Meyer et al. |
| 2002/0001395 A1 | 1/2002 | Davis et al. |
| 2002/0033844 A1 | 3/2002 | Levy et al. |
| 2002/0041692 A1 | 4/2002 | Seto et al. |
| 2002/0055951 A1 | 5/2002 | Shigetomi et al. |
| 2002/0059370 A1 | 5/2002 | Shuster |
| 2002/0059584 A1 | 5/2002 | Ferman et al. |
| 2002/0069218 A1 | 6/2002 | Sull et al. |
| 2002/0087565 A1 | 7/2002 | Hoekman et al. |
| 2002/0099694 A1 | 7/2002 | Diamond et al. |
| 2002/0099737 A1 | 7/2002 | Porter et al. |
| 2002/0103796 A1 * | 8/2002 | Hartley ......................... 707/4 |
| 2002/0103920 A1 | 8/2002 | Berkun et al. |
| 2002/0113824 A1 | 8/2002 | Myers |
| 2002/0120925 A1 | 8/2002 | Logan |
| 2002/0138619 A1 | 9/2002 | Ramaley et al. |
| 2002/0143976 A1 | 10/2002 | Barker et al. |
| 2002/0146235 A1 | 10/2002 | Watanabe et al. |
| 2002/0147728 A1 | 10/2002 | Goodman et al. |
| 2002/0157095 A1 | 10/2002 | Masumitsu et al. |
| 2002/0196976 A1 | 12/2002 | Mihcak et al. |
| 2003/0033420 A1 | 2/2003 | Eyal et al. |
| 2003/0036948 A1 | 2/2003 | Woodward et al. |
| 2003/0045953 A1 | 3/2003 | Weare |
| 2003/0045954 A1 | 3/2003 | Weare et al. |
| 2003/0120928 A1 | 6/2003 | Cato et al. |
| 2003/0135513 A1 | 7/2003 | Quinn et al. |
| 2003/0182254 A1 | 9/2003 | Plastina et al. |
| 2003/0182255 A1 | 9/2003 | Plastina et al. |
| 2003/0182315 A1 | 9/2003 | Plastina et al. |
| 2003/0221541 A1 * | 12/2003 | Platt ........................... 84/609 |
| 2003/0225777 A1 | 12/2003 | Marsh |
| 2003/0236582 A1 | 12/2003 | Zamir et al. |
| 2003/0236695 A1 | 12/2003 | Litwin, Jr. |
| 2004/0006575 A1 | 1/2004 | Visharam et al. |
| 2004/0017997 A1 | 1/2004 | Cowgill |
| 2004/0059795 A1 | 3/2004 | Ramey |
| 2004/0060426 A1 | 4/2004 | Weare et al. |
| 2004/0064476 A1 * | 4/2004 | Rounds ................... 707/104.1 |
| 2004/0086268 A1 | 5/2004 | Radha et al. |
| 2004/0123725 A1 * | 7/2004 | Kim ........................... 84/609 |
| 2004/0128308 A1 | 7/2004 | Obrador |
| 2004/0172593 A1 | 9/2004 | Wong et al. |
| 2004/0186993 A1 | 9/2004 | Risan et al. |
| 2004/0210533 A1 | 10/2004 | Picker et al. |
| 2004/0254659 A1 | 12/2004 | Bolas et al. |
| 2004/0260786 A1 | 12/2004 | Barile |
| 2004/0267693 A1 | 12/2004 | Lowe et al. |
| 2005/0021500 A1 | 1/2005 | Plastina et al. |
| 2005/0229225 A1 | 10/2005 | Klausberger et al. |
| 2005/0234958 A1 | 10/2005 | Sipusic et al. |
| 2005/0240661 A1 * | 10/2005 | Heller et al. ................. 709/219 |
| 2005/0278726 A1 | 12/2005 | Cano et al. |
| 2006/0032363 A1 | 2/2006 | Platt |
| 2006/0271989 A1 | 11/2006 | Glaser et al. |

FOREIGN PATENT DOCUMENTS

| | | |
|---|---|---|
| WO | 0128222 A2 | 4/2001 |
| WO | 03023781 A1 | 3/2003 |
| WO | 2004003907 A1 | 1/2004 |

OTHER PUBLICATIONS

Edward Swierk, et al., The Roma Personal Metadata Service, Mobile Networks and Applications vol. 7, pp. 407-418, 2002.

* cited by examiner

USER INTERFACE FOR ESTABLISHING A FILTERING ENGINE

BACKGROUND

Due to recent advances in technology, computing device users are now able to enjoy many features that provide an improved user experience, such as playing various media and multimedia content on personal, laptop, or handheld computers, as well as mobile phones and other portable media devices. In some multimedia environments, a computing device has access to a computer-readable medium storing media files such as Moving Picture Experts Group audio layer-3 (MP3) files and Windows® Media technologies audio (WMA) and video files. The computing device typically organizes the media files into playlists when the compressed media files are played on the computer.

Conventionally, users must expend considerable time and energy to build a playlist of media items (e.g., video files, music files, photos, etc.) of any complexity. Media items must be individually selected and added to each playlist. In addition to individual selection of media items for playlists, conventional systems also provide some automatic playlist generation with filters. For example, Windows® Media Player 10 by Microsoft Corporation of Redmond, Wash., features several automatically generated playlists based upon filtering of media items. For example, the media player may collect media items that are highly rated for an automatic playlist.

In addition, conventional systems allow a user to create an auto playlist based upon user-selected filters, whereby each additional filter is capable of reducing the total number of media items in the playlist. All filters are assigned the same weight, whereby each filter may affect the playlist with similar potential influence. For example, an auto playlist may be created by specifying only those media items with a particular term in the title and written before a particular date. Such an auto playlist applies all filters equally, excluding all media items without the required term and written after the specified date. In some instances, this may exclude all media items, rendering no media items in the playlist.

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, a method for generating a list of media by utilizing user-directed media preferences is disclosed for providing a user with control over media consumption. The user is encouraged to value each of her preferences to provide a relative indication of the importance of each preference in generating the list of media. This valuation of preferences is then utilized to provide a more focused and pleasing media list result to the client. A user interface provides a mechanism for entry and valuation of user preferences.

BRIEF DESCRIPTION OF THE DRAWINGS

Corresponding reference characters indicate corresponding parts throughout the drawings.

DETAILED DESCRIPTION

Figure 1:
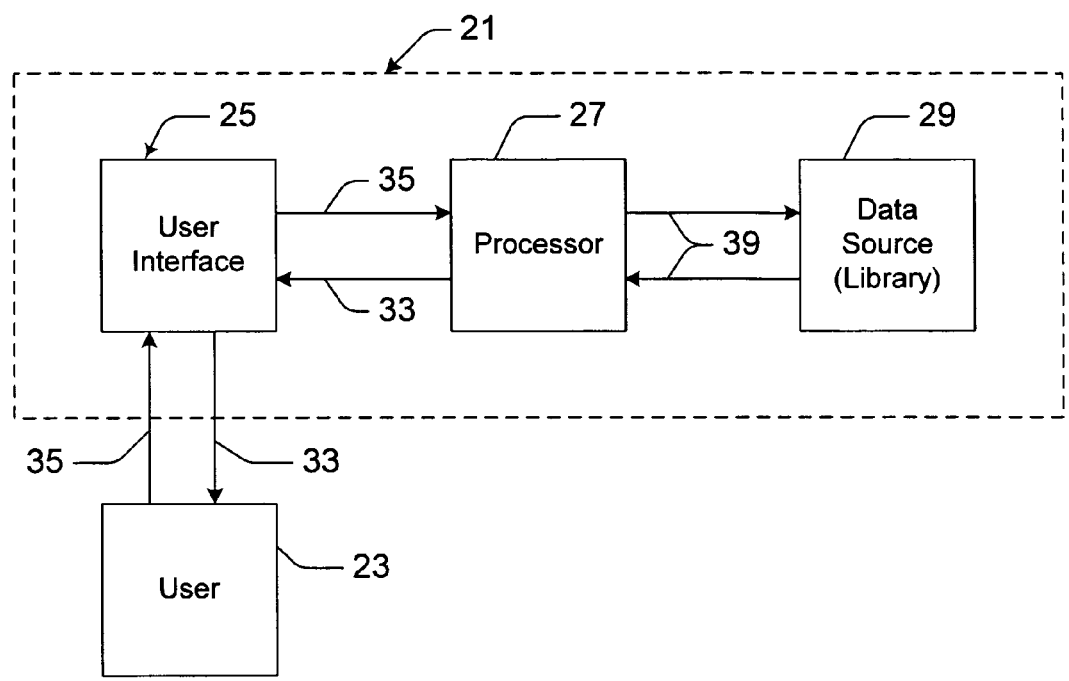
FIG. 1 is a diagram of a system of the present invention for establishing a filtering engine for generating an ordered list.

Referring now to FIG. 1, a system, generally indicated at 21, is disclosed for facilitating a user 23 in establishing a filtering engine for generating an ordered list of one or more media items selected from a library of media items. In one example, the user 23 may be collecting desirable media items for use in a user-defined playlist of media items. As used herein, the term media item comprises media files of multiple formats, including, music, speeches, audio books, news reports, movies, movie trailers, audio blogs, radio stations, television shows, images, and comedy routines, among others. As used herein, the term playlist means an ordered list of media items for the user 23 to play (in the case of music or video) or access (in the case of images or text files). In one example, the user 23 may utilize a media player program on a computer 130 (see FIG. 8) to access the playlist of media items. An example of such a media player is the Windows® Media Player 10 by Microsoft Corporation of Redmond, Wash.

The system 21 depicted in FIG. 1 comprises several components, including a user interface, generally indicated 25, a processor 27, and a data source 29 containing a library of media items. The user interface 25 provides information 33 to the user 23 and receives instructions 35 from the user. The details of the user interface will be discussed in greater detail below.

The system 21 additionally comprises the data source, or library, 29. The data source either stores a number of media items for use by the user 23 (i.e., a library) or provides a listing of what media items are available along with how to access such media items (e.g., data links) for use by the user. In one example, the media items contained in the library 29 are defined by the user 23. Such a library may be stored on a user's computer 130 (see FIG. 8), a portable media playing device (e.g., an MP3 player), a storage device (e.g., a flash memory device), or virtually any other data source. In another example, a service provider maintains a large library 29 of media items at a separate storage facility (e.g., a server) for streaming to the user 23 upon request. In yet another example, the library 29 may be defined by both a user's personal library of media items and the media items provided by a service provider. In any case, however, the library 29 acts as a repository for media items of potential of interest to the user 23. Such libraries of media items may be very large, containing many tens, hundreds, thousands, or even millions of media items, making it difficult to review or recall each of the media items when constructing a playlist.

The processor 27 of the system is adapted for performing the actions described below with respect to the user interfaces and methods of the present invention. The processor receives 35 instructions and selections from the user 23 through the user interface 25. The processor 27 provides information 33 to the user 23 through the user interface 25. The processor 27 communicates 39 with the data source 29 to access candidate media items. The detailed operation of the system 21 will be described in greater detail below with respect to the user interfaces and methods of the present invention.

As would be readily understood by one skilled in the art, the aforementioned system 21 does not require the user 23 to be presently accessing the World Wide Web or other information source for use by the system. Once the system 21 has collected metadata for all of the accessible media items, the system may be executed locally, whereby the user 23 need not disclose any private history regarding songs stored, accessed, played, etc. In doing so, the system 21 may be adapted to not disclose information about the user 23 (e.g., media consumption habits), as may be the case with some conventional media players.

User Interfaces

Figure 2:
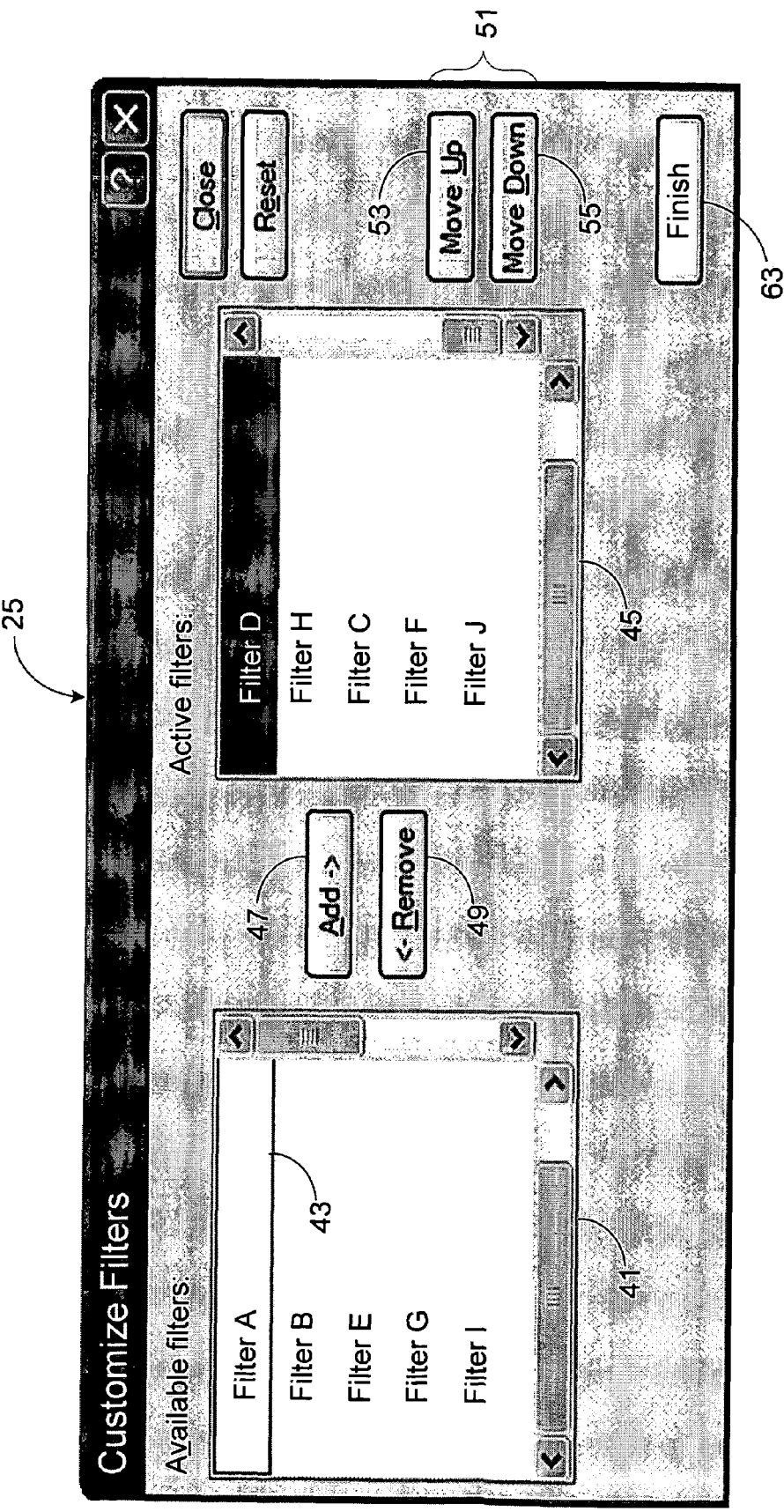
FIGS. 2-6 depict exemplary user interfaces of the present invention.
Figure 3:
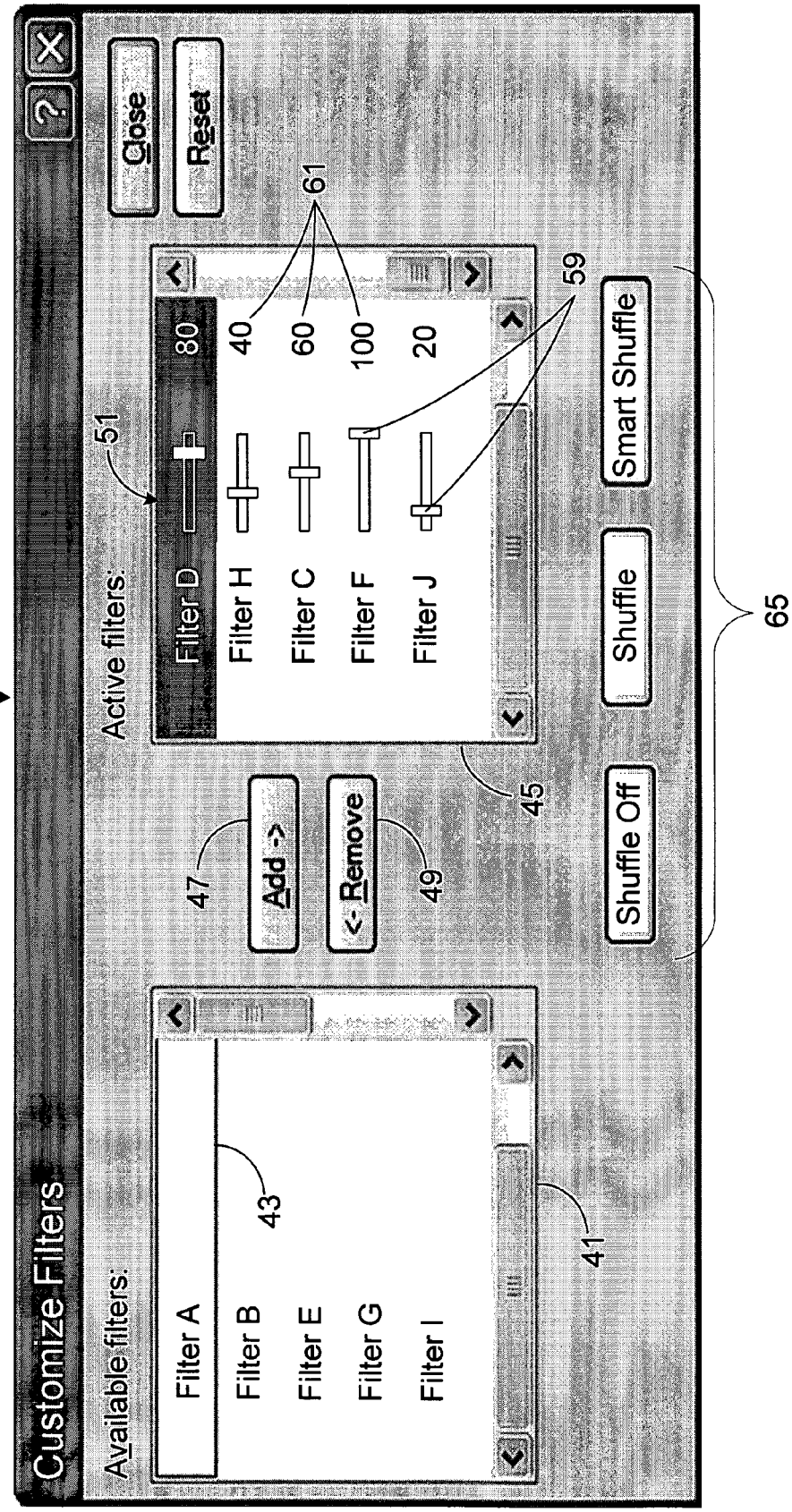

Referring now to FIGS. 2 and 3, one exemplary embodiment of the user interface 25 is disclosed for establishing a filtering engine for generating an ordered list, or playlist, of one or more media items selected from the library 29 of media items. Generally, the user interface 25 depicted in FIGS. 2 and 3 is exemplary only and details of its appearance should not be construed as critical. The user interface 25 comprises a filter list display 41 of filters. In one example, the filter list display 41 comprises at least three available filters. Depicted filters A, B, E, G, and I are exemplary only, as the user interface 25 may display filter names indicative of the function of the available filters. A sampling of exemplary filters are included in Appendix A of this application. Other filters are contemplated as within the scope of the claimed invention. A selection element 43 is further included with the user interface 25 for selecting a first filter from the filter list display 41. The exemplary selection element 43 depicted in FIG. 2 is a selection box surrounding the selected filter. The user interface 25 may further comprise second, third, and fourth selection elements corresponding to second, third, and fourth filters, respectively, from the filter list display 41. Other types of selection elements (e.g., check boxes, highlighting, and drag and drop selection, among others) are also contemplated as within the scope of the claimed invention. A selection element 43 may be associated with each available filter of the filter list display 41.

The user interface 25 further comprises an active filter list display 45 for displaying the selected filters once they are added to the active filter list. An adding element 47 of the user interface 25 allows the user 23 to add selected filters of the filter list display 41 to the active filter list display 45. The adding element 47 depicted in the exemplary user interface 25 of FIG. 2 is a button, but other adding elements are also contemplated as within the scope of the claimed invention. The user interface 25 also comprises a removal element 49 for removing selected filters from the active filter list display 45. In the embodiment shown, when a filter is selected and added to the active filter list display 45 (i.e., filters D, H, C, J, and F), those filters are removed from the available filter list display 41, leaving only filters A, B, E, G, and I remaining for selection and addition to the active filter list display 45.

A weighting element 51 is further included in the user interface 25 for weighting each active filter according to its relative importance to the user 23. In the embodiment shown in FIG. 2, the weighting element 51 comprises an ordering element for ordering the filters of the active filter list display 45 according to the relative importance of each filter. The ordering element includes a "Move Up" element 53 for promoting the rank of a particular filter and a "Move Down" element 55 for demoting the rank of a particular filter. For example, highlighted Filter D of FIG. 2 may be demoted by selecting the "Move Down" element 55 of the user interface.

Ordering the filters with the ordering element 51 establishes a weight for each filter. Each of the filters of the active filter list 45 is assigned a weight, whereby each filter impacts the filtering of the media items according to its relative weight. In other words, a weighted score for each media item is determined by determining each filter's individual score of a particular media item, weighting each filter score according to the weight assigned by the user 23, and combining the weighted scores together to create an aggregate score for the media item. Media items may then be compared to one another based upon these scores to determine which are included in the playlist. The playlist engine may then provide this ordered playlist to the user 23.

In a further alternative embodiment depicted in FIG. 3, the user interface 25A generally includes an available filter list display 41, selection elements 43, an active filter list display 45, an adding element 47, and a removal element 49, generally as set forth above. In addition, in this embodiment the weighting element, generally indicated 51, comprises an individual weighting element associated with each active filter. Each of the individual weighting elements comprises a user-adjustable slider bar 59 adapted for movement to assign a different weight 61 to each selected filter. In the example depicted in FIG. 3, active filter D is assigned a weight of 80, active filter H is assigned a weight of 40, and so forth down the active filter list display 45. Other weighting elements are also contemplated as within the scope of the claimed invention, including pull-down menus, pop-up menus, and dialog boxes, among others.

The user interfaces 25,25A may include a variety of selection elements for indicating that filter selection and weighting, or ranking, is complete. For example, the user interface 25 of FIG. 2 includes a selection element 63 labeled "Finish", the selection of which initiates action by the playlist engine to evaluate candidate media items to create the playlist for the user 23. In the example of FIG. 3, the user interface 25A comprises a three-state shuffle selection element 65 alternately providing a "Shuffle Off" selection, a "Shuffle" selection, and a "Smart Shuffle" selection. Selecting "Shuffle Off" instructs the playlist engine to simply generate a playlist directly from the library of media items including all media items, without the exclusion or prioritization of any media items. Alternately, selecting the "Shuffle" selection instructs the playlist engine to perform a conventional mathematical shuffle, simply reordering the media items of the library randomly, or according to conventional pseudorandom number generation techniques. Also alternately, selecting "Smart Shuffle" instructs the playlist engine to perform an intelligent shuffle based upon the selected and weighted filters, as with the "Finish" selection element 63 of the user interface 25 of FIG. 2.

Figure 4:
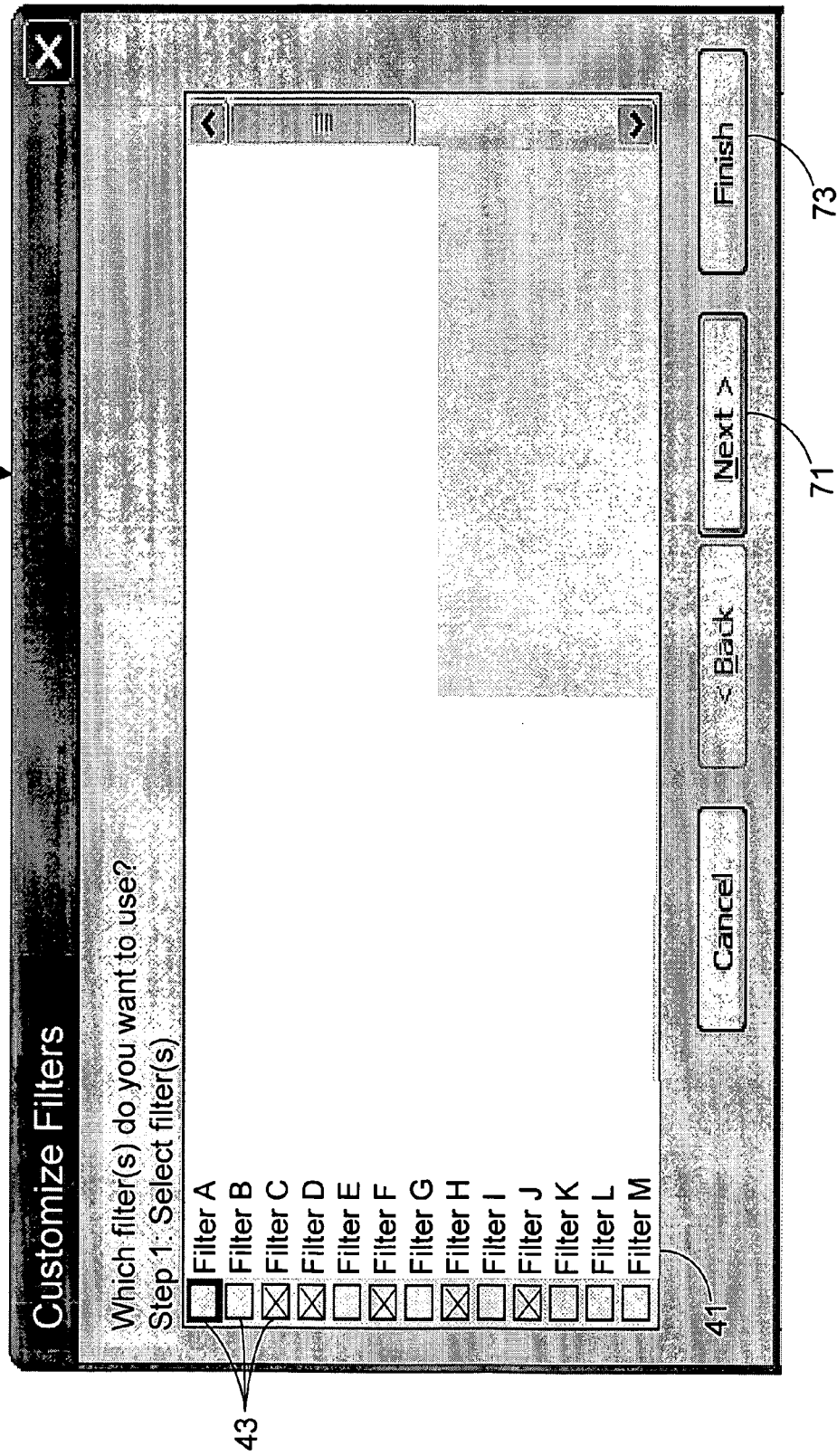
Figure 5:
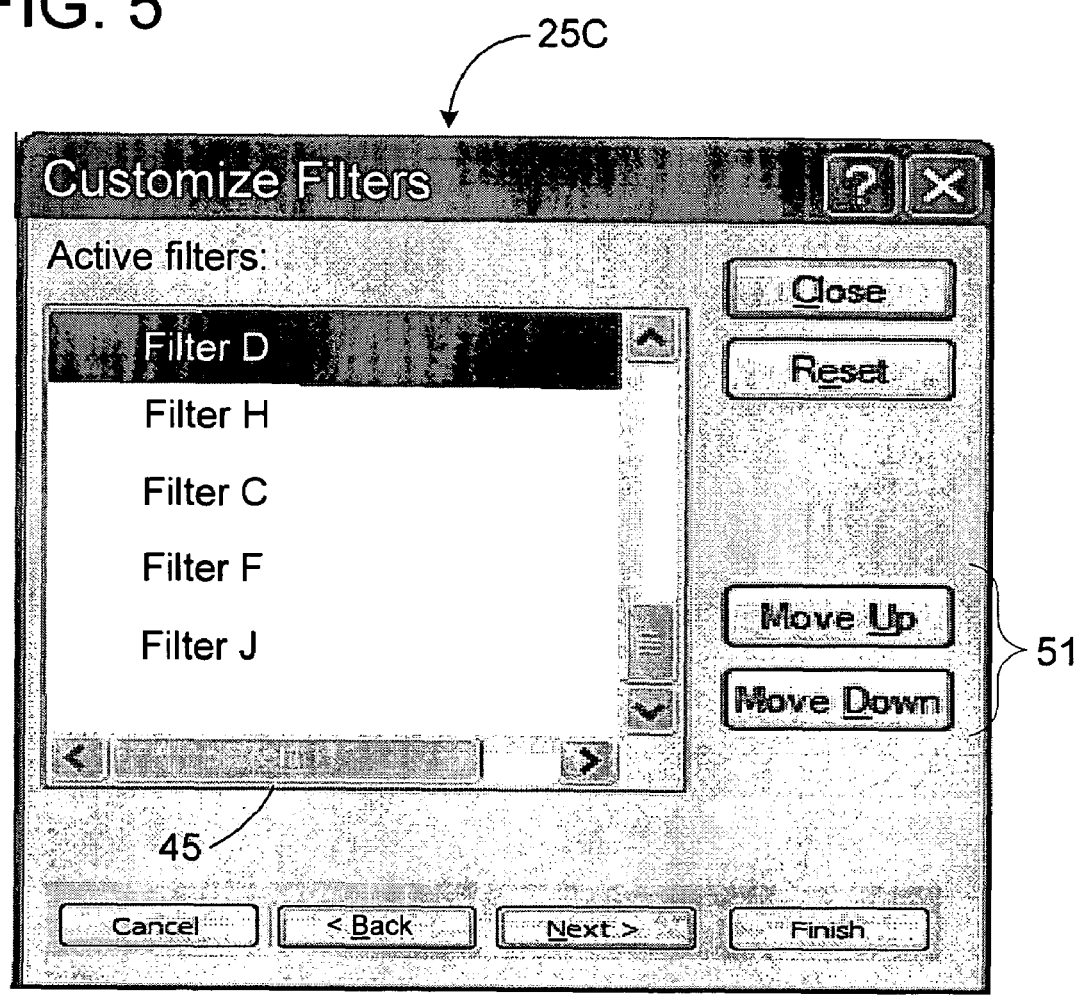
Figure 6:
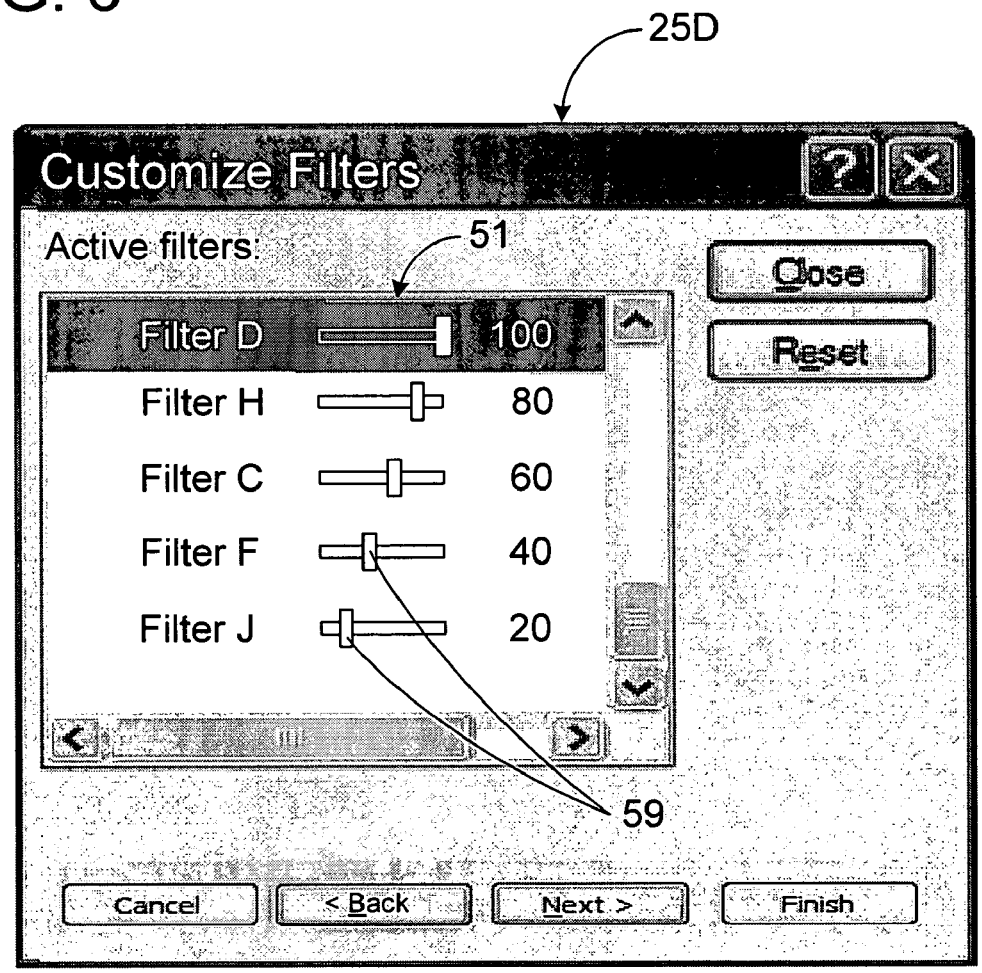
Figure 7:
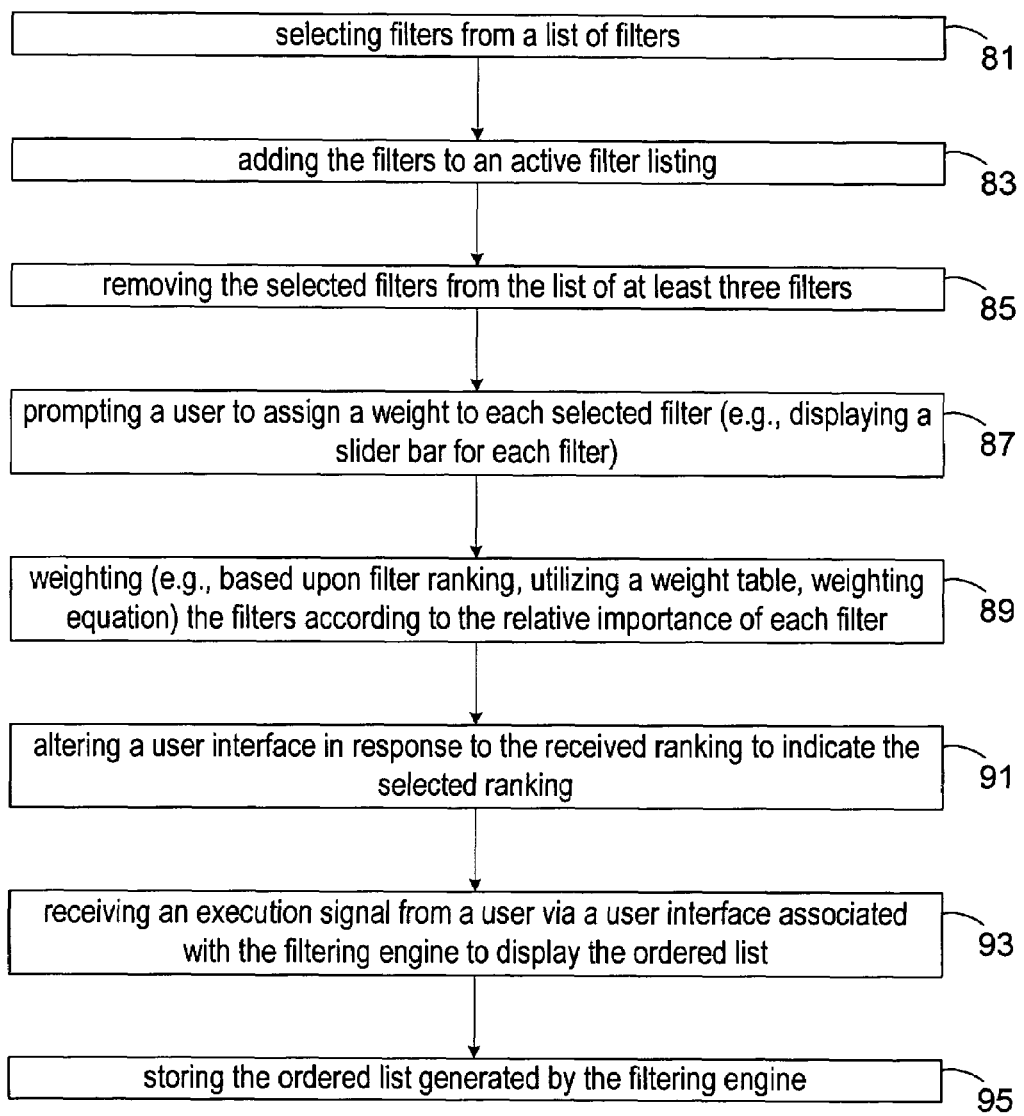
FIG. 7 is a flow diagram of methods of the present invention.

In another exemplary embodiment depicted in FIGS. 4-6, further user interfaces 25B-D are disclosed for establishing a filtering engine for generating an ordered list of one or more media items selected from a library 29 of media items. The user interfaces 25B-D of this embodiment function similarly to those described above, while providing a different interface for interacting with the user 23. For example, the user interface 25B comprises a filter list display 41 of filters available for selection by the user 23. The user interface 25B also comprises a selection element 43 associated with each filter for selecting one or more of the filters. In the embodiment shown, such selection elements 43 are check boxes, whereby filters C, D, F, H, and J are indicated as selected by the check marks in the check boxes. Other selection elements 43 may also be utilized without departing from the scope of the claimed invention (e.g., a pull-down menu, a pop-up menu, or a dialog box, among others). The user interface 25B may further comprise a selection complete element 71 associated with the filter list 41, selection of which indicates to the playlist engine that filter selection is complete and the user 23 is ready to weight the filters relative to one another. The user interface 25B further includes a "Finish" selection element 73 indicating to the playlist engine that the selected filters should be utilized without any further weighting.

Upon selection of the selection complete element 71, a further user interface 25C (FIG. 5) is displayed, including an active filter list display 45 for displaying the selected filters, similar to the active filter list display described above. The user interface 25C may also comprise a weighting element 51 for assigning a weight to each active filter of the active filter list 45 for adjusting the contribution of each filter in the generation of the ordered list. In the example of FIG. 5, the weighting element 51 comprises an ordering element for ordering the filters of the active filter list display according to the relative importance of each filter, similar to the ordering filter described above. The ordering of the filters establishes a weight for each filter.

In the additional example of FIG. 6, the weighting element, generally indicated 51, of the user interface 25D may further comprise an individual weighting element associated with each active filter, generally as described above with respect to the weighting element of the user interface 25A of FIG. 3. In particular, each of the individual weighting elements may comprise a user-adjustable slider bar 59 adapted for movement to assign a different weight to each selected filter.

Methods

In another example, a method for establishing a filtering engine for generating an ordered list of one or more media items selected from a library 29 of media items is described. Such a method may be implemented on the system 21 described above with one or more of the user interfaces 25-25D, also described above. The method comprises selecting, at 81, a first filter from a list of filters. The method further comprises adding, at 83, the first selected filter to an active filter listing. The method further comprises selecting, also at 81, a second filter from the list of filters and adding, also at 83, the second filter to the active filter listing. Any number of filters from the list of filters may be selected and added to the active filter listing. In another example, the method may further comprise removing, at 85, the selected first filter and the selected second filter (and any other selected filters) from the list of filters. Such an alteration may occur (e.g., FIGS. 2 and 3) on the user interface 25,25A so that the user 23 understands what filters remain available for selection and addition.

In one alternative embodiment, the method may further comprise assigning a weight to, or weighting, at 89, each filter according to the relative importance of each filter to the user 23. By increasing the weighting of a filter, the user 23 will increase the importance of that filter to the playlist engine in creating the playlist. In one example, the weighting may comprise weighting based upon a ranking (e.g., FIGS. 2 and 5). For example, the assigning of weights to each filter by rank may occur according to a weighting equation, such as the following equation:

$$\text{Weight} = \frac{\text{Total Number of Filters} - \text{Filter Rank} + 1}{\text{Total Number of Filters}} \times 100$$

whereby high ranking filters garner a higher weight than low ranking filters. For example, according to the above-noted equation, filters D, H, C, F, and J will have corresponding weights of 100, 80, 60, 40, and 20, respectively. Other equations are also contemplated as within the scope of the claimed invention. In a further alternative embodiment, the assigning of weights to each filter may comprise looking up predetermined values for the weights in a weight table. For example, a weight table may indicate that for four selected and added filters, the first filter receives a weight of 100, the second filter receives a weight of 72, the third filter receives a weight of 33, and the fourth filter receives a weight of 13. In one example, the method may further comprise altering, at 91, the user interface in response to the received ranking, or weighting, to indicate the selected ranking, or weighting. In any embodiment, the selecting of filters, the adding of filters, and the ranking of the selected filters may be undertaken by a single user 23, or multiple users.

In another example, the method may further comprise prompting a user, at 87, to assign a weight to each selected filter. In one such embodiment, the method may further comprise displaying a slider bar, also at 87, for each selected filter, the slider bar being movable by the user 23 to assign a different weight to each selected filter (e.g., FIGS. 3 and 6). In yet another example, the method may further comprise receiving, at 93, an execution signal from a user 23 via a user interface 25 associated with the filtering engine to display the ordered list. The method may further comprise storing, at 95, the ordered list generated by the filtering engine. Any method, device, or system for storing may be utilized without departing from the scope of the claimed invention.

General Purpose Computing Device

Figure 8:
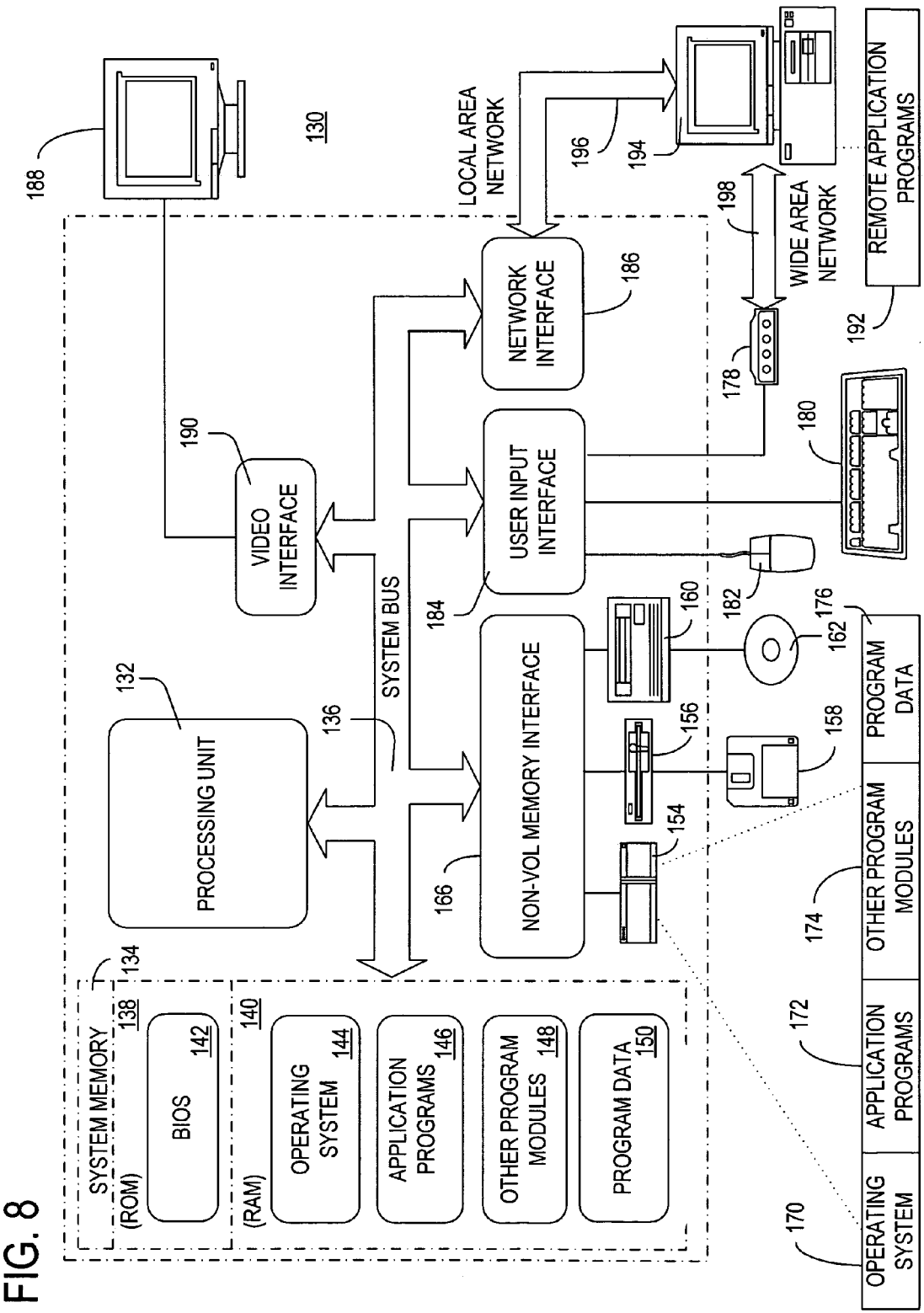
FIG. 8 is a block diagram illustrating one example of a suitable computing system environment in which the invention may be implemented.

FIG. 8 shows one example of a general purpose computing device in the form of a computer 130. In one embodiment of the invention, a computer such as the computer 130 is suitable for use in the other figures illustrated and described herein. In one example, the system 21 discussed above may be embodied by computer 130. Computer 130 additionally has one or more processors or processing units 132 and a system memory 134. In one example, the processor 27 discussed above may be embodied by processors or processing units 132. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. In one example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. In one example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user 23 may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown). In one example, the user interfaces discussed above may be embodied by such input devices and monitors.

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, in one example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, computer 130 executes a method such as described above for establishing a filtering engine for generating an ordered list of one or more media items selected from a library of media items. The computer 130 (or its components) selects a first filter from a list of at least three filters and adds the first filter to an active filter listing. The computer 130 (or its components) selects a second filter from the list of at least three filters and adds the second filter to the active filter listing. The computer 130 (or its components) ranks the first filter and the second filter according to the relative importance of each filter.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

APPENDIX A

| FILTER | FILTER ACTION |
| --- | --- |
| Album-based | Make selection Album-based, rather than media item-based via averaging filters over the album for the overall album rating. |
| Avoid speech/comedy media items | If possible to detect in media item, bias against those media items that do not have backing music (mono, low bit rate, narrow frequency band, etc.) |
| Bias by current date | Select the next media item based upon the current date and the release date of the media item (as well as well-known seasonal music). |
| Bias by day of week | Select media items that are commonly played on this day of the week. Use weekend vs. weekday playcount in the media player. |
| Bias by favorite content | Play favorite content more often than not. Relies upon star ratings (user, community, service-provided, or playcount generated). |
| Bias by household favorites | Favor media items that others on the same computer like (or favor away from those media items). |
| Bias by manual user avoidance | Favor against media items that sound like the last N media items the user manually showed dislike to (implicitly or explicitly). |
| Bias by manual user selection | Favor media items that sound like any of the last N media items the user manually selected to play (more closely match the style the user is looking for). |
| Bias by play popularity | Play content that has a higher playcount. Source data comes from community, service-provided, or playcount generated. |
| Bias by time of day | Selects media items that are commonly played at this time of the day. Uses morning/afternoon/evening/night playcount in the player |
| Burning | Favor media items (or bias against) that user has picked to burn to a redbook CD. |
| Does not sound like | Uses artist similarity vectors to prevent selection of music similar to a given artist |
| Exclude holiday music | General filter that removes holiday music from media item selections (e.g., fixed metadata keyword searches on key fields). |
| Greatest hits mode-album | Include only the top N media items from each album that meet "good" criteria. |
| Greatest hits mode-artist | Include only the top N media items from each artist that meet "good" criteria. |
| Library compendium CDs | Builds a series of sequential playlists, each the maximum allowed for redbook audio CDs, which provides short samples of every media item in the library for burning to a CD. |
| Library samplers | Builds a playlist that is the maximum that will fit on a Redbook audio CD (99 media items) that contains sample snippets of as broad a selection of the library as possible. A library with 99 media items would have all of them, while a library with 198 media items would try to pull a complete representative sample from half of them (rather than the first 99 in some flat list). |
| Not recently played | Prevents something recently played from being played again. Most important on very large playlists (e.g.: Genre = rock) |
| Same energy | Seeks to match energy of a media item. Uses DSP produced Hi/med/low output value from CD ripping process or metadata download. |
| Same era | Plays content within known musical periods as defined by inflection points within music industry (fixed metadata: e.g.: Flappers = 20s) |
| Same genre | Use genre field to bias music selection to be within a given genre. |
| Same mood | Use genre field to bias music selection to be within a given mood. |
| Skip one star rated media items | Skip media items having a one star rating. |
| Skip parental rating | Skip media items that have a non-friendly parental rating (a switch to switch the media player into a "clean" mode). |
| Skip sound-bytes | Favor heavily away from things that don't look like simple songs (e.g., short clips, or very long sets). Potentially other triggers as well. |
| Media items not device-based | Favor media items that are (or are not) on my device (e.g., in my library). |
| Sounds like | Uses artist similarity vectors to ensure selection of music similar to a given artist |
| User action bias filter | Inclusion percentage based upon an overall user bias field discerned from multiple potential user actions: (e.g.: play count, media item skips, increasing the volume, explicitly double-clicking on a media item, frequently playing from an album/ genre/ artist/mood, and any other user-biases discerned). This includes biasing towards what is believed to be desirable and away |

-continued

APPENDIX A

| FILTER | FILTER ACTION |
|---|---|
| | from what is believed undesirable based upon the data. |

What is claimed is:

1. A method for establishing a filtering engine for generating an ordered list of one or more media items selected from a library of media items, said method comprising:
   selecting a first filter from a list of filters, said first filter defining an action associated with one property of the one or more media items;
   adding said first filter to an active filter listing;
   selecting a second filter from said list of filters, said second filter defining another action associated with another property of the one or more media items;
   adding said second filter to said active filter listing;
   ranking said first filter and said second filter according to the relative importance of each filter;
   assigning a weight to each filter according to its rank, said assigned weight indicating a relative importance of each filter in generating the ordered list of the one or more media items;
   displaying an adjustable weighting element indicative of the assigned weight of each filter, said weighting element including at least one of the following: a user-adjustable slider bar, a pull-down menu, a pop-up menu, and a dialog box;
   determining an aggregate score for each media item of the library of media items, wherein the aggregate score is a function of weighted scores, wherein each weighted score is determined according to each said filter in the active filter listing and adjusted by the weight assigned to each said filter in the active filter listing; and
   generating the ordered list of the one or more media items based on the aggregate scores of the media items; and
   displaying a three-state shuffle selection element alternately for providing a shuffle off, a mathematical shuffle, and an intelligent shuffle selection, said intelligent shuffle corresponding to the ordered list of one or more media items;
   wherein said assigning of weights to each filter occurs as a function of a rank of the filter and a total number of active filters.

2. The method as set forth in claim 1 wherein said assigning of weights to each filter comprises looking up predetermined values for said weights in a weight table.

3. The method as set forth in claim 1 wherein said assigning of weights to each filter occurs according to the following equation:

$$\text{Weight} = \frac{\text{Total Number of Filters} - \text{Filter Rank} + 1}{\text{Total Number of Filters}} \times 100.$$

4. The method as set forth in claim 1 further comprising prompting a user to assign a weight to each selected filter.

5. The method as set forth in claim 1 wherein said selecting a first filter, said selecting a second filter, and said ranking the selected filters are undertaken by a user.

6. The method as set forth in claim 5 further comprising receiving an execution signal from a user via a user interface associated with the filtering engine to display the ordered list.

7. The method as set forth in claim 5 further comprising displaying a slider bar for each selected filter, said slider bar being movable by the user to assign a different weight to each selected filter.

8. The method as set forth in claim 1 further comprising altering a user interface in response to the received ranking to indicate the selected ranking.

9. The method as set forth in claim 1 further comprising removing said selected first filter and said selected second filter from the list of filters.

10. The method as set forth in claim 1 further comprising storing the ordered list generated by said filtering engine.

11. A system having a user interface for establishing a filtering engine for generating an ordered list of one or more media items selected from a library of media items, said system comprising:
   a processor configured to execute computer-executable instructions embodied in the following components presented as a part of the user interface for:
   a filter list for displaying filters;
   an active filter list display for displaying selected filters;
   a selection element for selecting a first filter from said filter list, said first filter defining an action associated with one property of the one or more media items, said selection element also for selecting a second filter from said filter list, said second filter defining another action associated with another property of the one or more media items;
   an adding element for adding said first filter to said active filter list display, said adding element also for adding said second filter to said active filter list display;
   a weighting element for weighting each active filter according to its relative importance, said weighting element indicating a relative importance of each filter in generating the ordered list of the one or more media items;
   a three-state shuffle selection element alternately providing a shuffle off, a mathematical shuffle, and an intelligent shuffle selection, said intelligent shuffle corresponding to the ordered list of one or more media items wherein the weighting element for each active filter is a function of the relative importance of the filter and the total number of active filters; and
   wherein the user interface displays an adjustable weighting element indicative of the weight of each filter, said weighting element including at least one of the following: a user-adjustable slider bar, a pull-down menu, a pop-up menu, and a dialog box, and wherein the system generates the ordered list of one or more media items by determining an aggregate score for each media item of the library of media items, wherein the aggregate score is a function of weighted scores, wherein each of the weighted scores is the score for the media item determined according to one of the filters in the active filter listing and adjusted by the weight assigned to said filter in the active filter listing.

12. The system as set forth in claim 11 wherein said weighting element comprises an ordering element for ordering said first filter and said second filter of said active filter list display according to the relative importance of each filter, said ordering of said first and second filters establishing a weight for each filter.

13. The system of claim 11 wherein said weighting element comprises an individual weighting element associated with each active filter.

14. The system of claim 13 wherein each of said individual weighting elements comprises a slider bar adapted for movement to assign a different weight to each selected filter.

15. The system of claim 11 wherein the weight assigned to each filter in the active filter listing is determined according to the following equation:

$$\text{Weight} = \frac{\text{Total Number of Filters} - \text{Filter Rank} + 1}{\text{Total Number of Filters}} \times 100.$$

16. A system for establishing a filtering engine for generating an ordered list of one or more media items selected from a library of media items, said system comprising:
a processor configured to execute computer-executable instructions embodied in the following components presented as a part of the user interface for:
a filter list for displaying filters;
a selection element associated with each filter for selecting one or more of said filters, each of said filters defining an action associated with one property of the one or more media items;
a selection complete element associated with said filter list for indicating that filter selection is complete;
an active filter list display for displaying the selected filters; and
a weighting element for weighting each active filter of the active filter list for adjusting the contribution of each filter in the generation of the ordered list, wherein the weighting element for each active filter is a function of the relative importance of the filter and the total number of active filters, and wherein the user interface displays an adjustable weighting element indicative of the weight of each filter, said weighting element including at least one of the following: a user-adjustable slider bar, a pull-down menu, a pop-up menu, and a dialog box; and
a three-state shuffle selection element alternately providing a shuffle off, a mathematical shuffle, and an intelligent shuffle selection, said intelligent shuffle corresponding to the ordered list of one or more media items:
wherein the system generates the ordered list of one or more media items by determining an aggregate score for each media item of the library of media items, wherein the aggregate score is a function of weighted scores, wherein each weighted score is determined according to each said filters in the active filter listing and adjusted by the weight assigned to each said filter in the active filter listing.

17. The system as set forth in claim 16 wherein said weighting element comprises an ordering element for ordering said first filter and said second filter of said active filter list display according to the relative importance of each filter, said ordering of said first and second filters establishing a weight for each filter.

18. The system of claim 16 wherein said weighting element comprises an individual weighting element associated with each active filter.

19. The system of claim 18 wherein each of said individual weighting elements comprises a slider bar adapted for movement to assign a different weight to each selected filter.

20. The system of claim 16 wherein the weight assigned to each of the filters in the active filter listing is determined according to the following equation:

$$\text{Weight} = \frac{\text{Total Number of Filters} - \text{Filter Rank} + 1}{\text{Total Number of Filters}} \times 100.$$

* * * * *

UNITED STATES PATENT AND TRADEMARK OFFICE
CERTIFICATE OF CORRECTION

PATENT NO.       : 7,580,932 B2                                Page 1 of 1
APPLICATION NO. : 11/182911
DATED            : August 25, 2009
INVENTOR(S)      : Plastina et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 343 days.

Signed and Sealed this

Fourteenth Day of September, 2010

David J. Kappos
*Director of the United States Patent and Trademark Office*